(12) United States Patent
Mollenkopf et al.

(10) Patent No.: US 7,053,756 B2
(45) Date of Patent: May 30, 2006

(54) FACILITATING COMMUNICATION OF DATA SIGNALS ON ELECTRIC POWER SYSTEMS

(75) Inventors: James Douglas Mollenkopf, Fairfax, VA (US); Leonard D. Cope, Jefferson, MD (US)

(73) Assignee: Current Technologies, LLC, Germantown, MD (US)

( * ) Notice: Subject to any disclaimer, the term of this patent is extended or adjusted under 35 U.S.C. 154(b) by 706 days.

(21) Appl. No.: 10/036,914

(22) Filed: Dec. 21, 2001

(65) Prior Publication Data

US 2003/0179080 A1    Sep. 25, 2003

(51) Int. Cl.
*H04M 11/04* (2006.01)
(52) U.S. Cl. .......... 340/310.01; 340/533; 340/538; 340/310.07; 379/399.1
(58) Field of Classification Search .......... 340/310.01, 340/531, 533, 537, 538, 646, 693.1, 693.4, 340/310.07, 310.08, 310.05, 310.03; 379/399.01
See application file for complete search history.

(56) References Cited

U.S. PATENT DOCUMENTS

| | | | |
|---|---|---|---|
| 1,547,242 A | 7/1925 | Strieby | 340/310.03 |
| 2,298,435 A | 10/1942 | Tunick | |
| 2,577,731 A | 12/1951 | Berger | 370/293 |
| 3,369,078 A | 2/1968 | Stradley | 381/2 |
| 3,445,814 A | 5/1969 | Spalti | 340/151 |
| 3,605,009 A | 9/1971 | Enge | 323/93 |
| 3,641,536 A | 2/1972 | Prosprich | 340/870.15 |
| 3,656,112 A | 4/1972 | Paull | 340/151 |
| 3,696,383 A | 10/1972 | Oishi et al. | 340/310 |
| 3,701,057 A | 10/1972 | Hoer | 333/112 |
| 3,702,460 A | 11/1972 | Blose | 340/150 |
| 3,810,096 A | 5/1974 | Kabat et al. | 340/147 R |
| 3,846,638 A | 11/1974 | Wetherell | 307/3 |
| 3,895,370 A | 7/1975 | Valentini | 340/310 |
| 3,900,842 A | 8/1975 | Calabro et al. | 340/310.03 |
| 3,911,415 A | 10/1975 | Whyte | 340/310 |
| 3,942,168 A | 3/1976 | Whyte | 340/310.01 |
| 3,942,170 A | 3/1976 | Whyte | 340/310 |
| 3,962,547 A | 6/1976 | Pattantyus-Abraham | 179/2.5 R |
| 3,964,048 A | 6/1976 | Lusk et al. | 340/310 R |
| 3,967,264 A | 6/1976 | Whyte et al. | 340/310.08 |
| 3,973,087 A | 8/1976 | Fong | 340/310.06 |
| 3,973,240 A | 8/1976 | Fong | 340/151 |

(Continued)

FOREIGN PATENT DOCUMENTS

DE    197 28 270 A1    1/1999

(Continued)

OTHER PUBLICATIONS

U.S. Appl. No. 09/765,910, filed Jan. 19, 2001, Kline.

(Continued)

*Primary Examiner*—Daryl C. Pope
(74) *Attorney, Agent, or Firm*—Mel Barnes; Manelli Denison & Selter PLLC (57) ABSTRACT

The invention includes a method, system, and device for communicating a data signal on an electric power system. The inventive method includes communicating the data signal to the electric power system, and modifying the characteristics of the electric power system to reduce the data signal communicated to an electrical component located on the electric power system without substantially reducing a voltage signal. The method further includes communicating the data signal to a customer premise. The electrical component may include, for example, an electrical transformer.

35 Claims, 5 Drawing Sheets

U.S. PATENT DOCUMENTS

| | | | |
|---|---|---|---|
| 4,004,110 A | 1/1977 | Whyte | 179/170 J |
| 4,004,257 A | 1/1977 | Geissler | 333/207 |
| 4,012,733 A | 3/1977 | Whyte | 340/310 |
| 4,016,429 A | 4/1977 | Vercellotti et al. | 307/149 |
| 4,017,845 A | 4/1977 | Killian et al. | 340/310.02 |
| 4,053,876 A | 10/1977 | Taylor | 340/529 |
| 4,057,793 A | 11/1977 | Johnson et al. | 340/310 R |
| 4,060,735 A | 11/1977 | Pascucci et al. | 307/3 |
| 4,070,572 A | 1/1978 | Summerhayes | 250/199 |
| 4,119,948 A | 10/1978 | Ward et al. | 340/870.02 |
| 4,142,178 A | 2/1979 | Whyte et al. | 340/310 |
| 4,188,619 A | 2/1980 | Perkins | 340/310 R |
| 4,239,940 A | 12/1980 | Dorfman | 179/2.51 |
| 4,250,489 A | 2/1981 | Dudash et al. | 340/147 T |
| 4,254,402 A | 3/1981 | Perkins | 340/310 R |
| 4,263,549 A | 4/1981 | Toppeto | 324/127 |
| 4,268,818 A | 5/1981 | Davis et al. | 340/870.38 |
| 4,323,882 A | 4/1982 | Gajjer | 340/310 R |
| 4,357,598 A | 11/1982 | Melvin, Jr. | 340/310 A |
| 4,359,644 A | 11/1982 | Foord | 307/40 |
| 4,367,522 A | 1/1983 | Forstbauer et al. | 363/137 |
| 4,383,243 A | 5/1983 | Krügel et al. | 340/310.02 |
| 4,386,436 A | 5/1983 | Kocher et al. | 455/151.4 |
| 4,408,186 A | 10/1983 | Howell | 340/310 A |
| 4,409,542 A | 10/1983 | Becker et al. | 324/548 |
| 4,413,250 A | 11/1983 | Porter et al. | 340/310.01 |
| 4,419,621 A | 12/1983 | Becker et al. | 324/548 |
| 4,433,284 A | 2/1984 | Perkins | 323/215 |
| 4,442,492 A | 4/1984 | Karlsson et al. | 364/464 |
| 4,457,014 A | 6/1984 | Bloy | 381/98 |
| 4,468,792 A | 8/1984 | Baker et al. | 375/45 |
| 4,471,399 A | 9/1984 | Udren | 361/64 |
| 4,473,816 A | 9/1984 | Perkins | 340/310 |
| 4,473,817 A | 9/1984 | Perkins | 340/310 |
| 4,475,209 A | 10/1984 | Udren | 375/214 |
| 4,479,033 A | 10/1984 | Brown et al. | 455/402 |
| 4,481,501 A | 11/1984 | Perkins | 340/310 |
| 4,495,386 A | 1/1985 | Brown et al. | 455/402 |
| 4,504,705 A | 3/1985 | Pilloud | 381/77 |
| 4,517,548 A | 5/1985 | Ise et al. | 340/310.06 |
| 4,569,045 A | 2/1986 | Schieble et al. | 370/85 |
| 4,599,598 A | 7/1986 | Komoda et al. | 340/310.02 |
| 4,636,771 A | 1/1987 | Ochs | 340/310.05 |
| 4,638,298 A | 1/1987 | Spiro | 370/392 |
| 4,642,607 A | 2/1987 | Strom et al. | 340/310 |
| 4,644,321 A | 2/1987 | Kennon | 340/310 A |
| 4,652,855 A | 3/1987 | Weikel | 340/310 |
| 4,668,934 A | 5/1987 | Shuey | 340/310.06 |
| 4,675,648 A | 6/1987 | Roth et al. | 340/310.07 |
| 4,683,450 A | 7/1987 | Max et al. | 333/202 |
| 4,686,382 A | 8/1987 | Shuey | 307/149 |
| 4,686,641 A | 8/1987 | Evans | 364/580 |
| 4,697,166 A | 9/1987 | Warnagiris et al. | 340/310 R |
| 4,701,945 A | 10/1987 | Pedigo | 455/402 |
| 4,724,381 A | 2/1988 | Crimmins | 324/127 |
| 4,745,391 A | 5/1988 | Gajjar | 340/310 A |
| 4,746,897 A | 5/1988 | Shuey | 340/310 R |
| 4,749,992 A | 6/1988 | Fitzmeyer et al. | 340/870.02 |
| 4,766,414 A | 8/1988 | Shuey | 340/310 A |
| 4,772,870 A | 9/1988 | Reyes | 340/310 R |
| 4,785,195 A | 11/1988 | Rochelle et al. | 307/18 |
| 4,800,363 A | 1/1989 | Braun et al. | 340/310 A |
| 4,815,106 A | 3/1989 | Propp et al. | 375/257 |
| 4,835,517 A | 5/1989 | van der Gracht et al. | 340/310 A |
| 4,890,089 A | 12/1989 | Shuey | 340/310.07 |
| 4,903,006 A | 2/1990 | Boomgaard | 340/310 A |
| 4,904,996 A | 2/1990 | Fernandes | 340/870.07 |
| 4,912,553 A | 3/1990 | Pal et al. | 725/79 |
| 4,962,496 A | 10/1990 | Vercellotti et al. | 370/204 |
| 4,973,940 A | 11/1990 | Sakai et al. | 340/310 R |
| 4,979,183 A | 12/1990 | Cowart | 375/142 |
| 5,006,846 A | 4/1991 | Granville et al. | 340/870.28 |
| 5,066,939 A | 11/1991 | Mansfield, Jr. | 340/310 R |
| 5,068,890 A | 11/1991 | Nilssen | 379/90 |
| 5,132,992 A | 7/1992 | Yurt et al. | 375/240 |
| 5,148,144 A | 9/1992 | Sutterlin et al. | 340/310 A |
| 5,151,838 A | 9/1992 | Dockery | 340/310 R |
| 5,185,591 A | 2/1993 | Shuey | 340/310 A |
| 5,191,467 A | 3/1993 | Kapany et al. | 359/341 |
| 5,210,519 A | 5/1993 | Moore | 340/310 |
| 5,257,006 A | 10/1993 | Graham et al. | 340/310 A |
| 5,264,823 A | 11/1993 | Stevens | 340/310.04 |
| 5,272,462 A | 12/1993 | Teyssandier et al. | 340/310.01 |
| 5,301,208 A | 4/1994 | Rhodes | 375/36 |
| 5,319,634 A | 6/1994 | Bartholomew et al. | 370/18 |
| 5,341,265 A | 8/1994 | Westrom et al. | 361/44 |
| 5,351,272 A | 9/1994 | Abraham | 375/38 |
| 5,355,109 A | 10/1994 | Yamazaki | 336/92 |
| 5,359,625 A | 10/1994 | Vander Mey et al. | 375/1 |
| 5,369,356 A | 11/1994 | Kinney et al. | 324/142 |
| 5,375,141 A | 12/1994 | Takahashi | 375/1 |
| 5,406,249 A | 4/1995 | Pettus | 340/310.06 |
| 5,410,720 A | 4/1995 | Osterman | 725/150 |
| 5,426,360 A | 6/1995 | Maraio et al. | 324/126 |
| 5,432,841 A | 7/1995 | Rimer | 455/457 |
| 5,448,229 A | 9/1995 | Lee, Jr. | 340/870.02 |
| 5,461,629 A | 10/1995 | Sutterlin et al. | 371/30 |
| 5,477,091 A | 12/1995 | Fiorina et al. | 307/66 |
| 5,481,249 A | 1/1996 | Sato | 340/2.1 |
| 5,485,040 A | 1/1996 | Sutterlin | 307/3 |
| 5,497,142 A | 3/1996 | Chaffanjon | 340/310.06 |
| 5,498,956 A | 3/1996 | Kinney et al. | 324/142 |
| 4,749,992 A | 6/1996 | Fitzmeyer et al. | 340/870.02 |
| 5,533,054 A | 7/1996 | DeAndrea et al. | 375/286 |
| 5,537,087 A | 7/1996 | Naito | 336/92 |
| 5,559,377 A | 9/1996 | Abraham | 307/104 |
| 5,568,185 A | 10/1996 | Yoshikazu | 348/22 |
| 5,579,221 A | 11/1996 | Mun | 364/188 |
| 5,579,335 A | 11/1996 | Sutterlin et al. | 375/200 |
| 5,592,354 A | 1/1997 | Nocentino, Jr. | 361/69 |
| 5,592,482 A | 1/1997 | Abraham | 348/8 |
| 5,598,406 A | 1/1997 | Albrecht et al. | 370/296 |
| 5,616,969 A | 4/1997 | Morava | 307/91 |
| 5,625,863 A | 4/1997 | Abraham | 455/3.3 |
| 5,630,204 A | 5/1997 | Hylton et al. | 455/3.3 |
| 5,640,416 A | 6/1997 | Chalmers | 375/147 |
| 5,664,002 A | 9/1997 | Skinner, Sr. | 379/56.2 |
| 5,684,450 A | 11/1997 | Brown | 340/310.02 |
| 5,691,691 A | 11/1997 | Merwin et al. | 340/310.02 |
| 5,694,108 A | 12/1997 | Shuey | 340/310.01 |
| 5,705,974 A | 1/1998 | Patel et al. | 340/310.08 |
| 5,712,614 A | 1/1998 | Patel et al. | 340/310.03 |
| 5,717,685 A | 2/1998 | Abraham | 370/30 |
| 5,726,980 A | 3/1998 | Rickard | 370/293 |
| 5,748,104 A | 5/1998 | Argyroudis et al. | 340/870.11 |
| 5,748,671 A | 5/1998 | Sutterlin et al. | 375/206 |
| 5,751,803 A | 5/1998 | Shpater | 379/379 |
| 5,770,996 A | 6/1998 | Severson et al. | 340/310.08 |
| 5,774,526 A | 6/1998 | Propp et al. | 379/90.1 |
| 5,777,544 A | 7/1998 | Vander Mey et al. | 340/310.06 |
| 5,777,545 A | 7/1998 | Patel et al. | 341/310.06 |
| 5,777,769 A | 7/1998 | Coutinho | 359/173 |
| 5,778,116 A | 7/1998 | Tomich | 385/16 |
| 5,796,607 A | 8/1998 | Le Van Suu | 364/140.01 |
| 5,798,913 A * | 8/1998 | Tiesinga et al. | 363/21.13 |
| 5,801,643 A | 9/1998 | Williams et al. | 340/870.02 |
| 5,802,102 A | 9/1998 | Davidovici | 375/152 |
| 5,805,053 A | 9/1998 | Patel et al. | 340/310.01 |
| 5,805,458 A | 9/1998 | McNamara et al. | 702/60 |
| 5,818,127 A * | 10/1998 | Abraham | 307/106 |
| 5,818,821 A | 10/1998 | Schurig | 370/293 |
| 5,828,293 A | 10/1998 | Rickard | 340/310.04 |
| 5,835,005 A | 11/1998 | Furukawa et al. | 340/310.01 |

| | | | |
|---|---|---|---|
| 5,847,447 A | 12/1998 | Rozin et al. | 257/678 |
| 5,850,114 A | 12/1998 | Froidevaux | 307/105 |
| 5,856,776 A | 1/1999 | Armstrong et al. | 340/310.01 |
| 5,864,284 A | 1/1999 | Sanderson et al. | 340/310.01 |
| 5,870,016 A | 2/1999 | Shresthe | 340/310.01 |
| 5,880,677 A | 3/1999 | Lestician | 340/825.06 |
| 5,881,098 A | 3/1999 | Tzou | 375/152 |
| 5,892,430 A | 4/1999 | Wiesman et al. | 340/310.01 |
| 5,892,758 A | 4/1999 | Argyroudis | 370/335 |
| 5,929,750 A | 7/1999 | Brown | 340/310.02 |
| 5,933,071 A | 8/1999 | Brown | 340/310.01 |
| 5,933,073 A | 8/1999 | Shuey | 340/310.07 |
| 5,937,003 A | 8/1999 | Sutterlin et al. | 375/208 |
| 5,937,342 A | 8/1999 | Kline | 455/402 |
| 5,949,327 A * | 9/1999 | Brown | 340/310.01 |
| 5,952,914 A | 9/1999 | Wynn | 340/310.01 |
| 5,963,585 A | 10/1999 | Omura et al. | 375/207 |
| 5,977,650 A | 11/1999 | Rickard et al. | 307/3 |
| 5,978,371 A | 11/1999 | Mason, Jr. et al. | 370/389 |
| 5,982,276 A | 11/1999 | Stewart | 340/310.01 |
| 5,994,998 A | 11/1999 | Fisher et al. | 340/310.01 |
| 5,994,999 A | 11/1999 | Ebersohl | 340/310.01 |
| 6,014,386 A | 1/2000 | Abraham | 370/485 |
| 6,023,106 A | 2/2000 | Abraham | 307/3 |
| 6,037,678 A | 3/2000 | Rickard | 307/89 |
| 6,037,857 A | 3/2000 | Behrens et al. | 340/310.03 |
| 6,040,759 A | 3/2000 | Sanderson | 340/310.01 |
| 6,091,932 A | 7/2000 | Langlais | 455/5.1 |
| 6,104,707 A | 8/2000 | Abraham | 370/295 |
| 6,121,765 A | 9/2000 | Carlson | 323/359 |
| 6,130,896 A | 10/2000 | Lueker et al. | 370/469 |
| 6,140,911 A | 10/2000 | Fisher et al. | 340/310.01 |
| 6,141,634 A | 10/2000 | Flint et al. | 703/18 |
| 6,144,292 A | 11/2000 | Brown | 340/310.02 |
| 6,151,330 A | 11/2000 | Liberman | 370/449 |
| 6,151,480 A | 11/2000 | Fischer et al. | 340/310.01 |
| 6,154,488 A | 11/2000 | Hunt | 375/219 |
| 6,157,292 A | 12/2000 | Piercy et al. | 340/310.01 |
| 6,172,597 B1 | 1/2001 | Brown | 340/310.02 |
| 6,175,860 B1 | 1/2001 | Gaucher | 709/208 |
| 6,177,849 B1 | 1/2001 | Barsellotti et al. | 333/177 |
| 6,212,658 B1 | 4/2001 | Le Van Suu | 714/749 |
| 6,226,166 B1 | 5/2001 | Gumley et al. | 361/118 |
| 6,229,434 B1 | 5/2001 | Knapp et al. | 340/310.01 |
| 6,239,722 B1 | 5/2001 | Colton et al. | 340/870.02 |
| 6,243,413 B1 | 6/2001 | Beukema | 375/222 |
| 6,243,571 B1 | 6/2001 | Bullock et al. | 455/402 |
| 6,255,805 B1 | 7/2001 | Papalia et al. | 323/207 |
| 6,255,935 B1 | 7/2001 | Lehmann et al. | 340/310.07 |
| 6,275,144 B1 | 8/2001 | Rumbaugh | 340/310.01 |
| 6,282,405 B1 | 8/2001 | Brown | 725/79 |
| 6,297,729 B1 | 10/2001 | Abali et al. | 340/310.01 |
| 6,297,730 B1 | 10/2001 | Dickinson | 340/310.01 |
| 6,300,881 B1 | 10/2001 | Yee et al. | 340/870.02 |
| 6,313,738 B1 | 11/2001 | Wynn | 340/310.03 |
| 6,317,031 B1 | 11/2001 | Rickard | 340/310.03 |
| 6,331,814 B1 | 12/2001 | Albano et al. | 340/310.01 |
| 6,335,672 B1 | 1/2002 | Tumlin et al. | 336/175 |
| 6,373,376 B1 | 4/2002 | Adams et al. | 340/310.01 |
| 6,384,580 B1 | 5/2002 | Ochoa et al. | 323/207 |
| 6,396,391 B1 * | 5/2002 | Binder | 340/310.01 |
| 6,396,392 B1 | 5/2002 | Abraham | 340/310.01 |
| 6,404,773 B1 | 6/2002 | Williams et al. | 370/463 |
| 6,407,987 B1 | 6/2002 | Abraham | 370/295 |
| 6,414,578 B1 | 7/2002 | Jitaru | 336/170 |
| 6,417,762 B1 | 7/2002 | Comer | 340/310.01 |
| 6,425,852 B1 | 7/2002 | Epstein et al. | 600/13 |
| 6,441,723 B1 | 8/2002 | Mansfield, Jr. et al. | 340/310.01 |
| 6,449,318 B1 | 9/2002 | Rumbaugh | 375/309 |
| 6,452,482 B1 | 9/2002 | Cern | 340/310.01 |
| 6,480,510 B1 | 11/2002 | Binder | 370/502 |
| 6,486,747 B1 | 11/2002 | DeCramer et al. | 333/25 |
| 6,492,897 B1 | 12/2002 | Mowery, Jr. | 340/310.01 |
| 6,496,104 B1 | 12/2002 | Kline | 340/310.01 |
| 6,504,357 B1 | 1/2003 | Hemminger et al. | 340/310.01 |
| 6,507,573 B1 | 1/2003 | Brandt et al. | 370/335 |
| 6,515,485 B1 | 2/2003 | Bullock et al. | 324/601 |
| 6,522,626 B1 | 2/2003 | Greenwood | 370/208 |
| 6,522,650 B1 | 2/2003 | Yonge, III et al. | 370/390 |
| 6,549,120 B1 | 4/2003 | deBuda | 340/310.01 |
| 6,577,231 B1 | 6/2003 | Litwin, Jr. et al. | 340/310.01 |
| 6,590,493 B1 * | 7/2003 | Rasimas et al. | 340/310.01 |
| 6,611,134 B1 | 8/2003 | Chung | 324/74 |
| 6,624,532 B1 | 9/2003 | Davidow et al. | 307/39 |
| 6,646,447 B1 | 11/2003 | Cern et al. | 324/539 |
| 6,650,249 B1 | 11/2003 | Meyer et al. | 340/870.02 |
| 6,667,685 B1 | 12/2003 | Wasaki et al. | 340/310.03 |
| 6,668,058 B1 | 12/2003 | Grimes | 379/322 |
| 6,683,531 B1 | 1/2004 | Diamanti et al. | 340/310.01 |
| 6,686,832 B1 | 2/2004 | Abraham | 340/310.01 |
| 6,696,925 B1 | 2/2004 | Aiello, Jr. | 340/310.01 |
| 6,753,742 B1 | 6/2004 | Kim et al. | 333/24 R |
| 6,785,532 B1 | 8/2004 | Rickard | 455/402 |
| 6,785,592 B1 | 8/2004 | Smith et al. | 700/291 |
| 6,788,745 B1 * | 9/2004 | Lim et al. | 375/297 |
| 6,844,809 B1 | 1/2005 | Manis et al. | 340/310.02 |
| 2001/0038329 A1 | 11/2001 | Diamanti et al. | 340/310.01 |
| 2001/0038343 A1 | 11/2001 | Meyer et al. | 340/870.02 |
| 2001/0045888 A1 | 11/2001 | Kline | 340/310.01 |
| 2001/0052843 A1 | 12/2001 | Weisman et al. | 340/870.02 |
| 2001/0054953 A1 | 12/2001 | Kline | 340/310.01 |
| 2002/0002040 A1 | 1/2002 | Kline et al. | 455/402 |
| 2002/0010870 A1 | 1/2002 | Gardner | 713/300 |
| 2002/0014884 A1 | 2/2002 | Chung | 324/74 |
| 2002/0027496 A1 | 3/2002 | Cern et al. | 340/310.01 |
| 2002/0041228 A1 | 4/2002 | Zhang | 340/310.01 |
| 2002/0048368 A1 | 4/2002 | Gardner | 380/277 |
| 2002/0060624 A1 | 5/2002 | Zhang | 340/310.01 |
| 2002/0071452 A1 | 6/2002 | Abraham | 370/480 |
| 2002/0080010 A1 | 6/2002 | Zhang | 340/310.06 |
| 2002/0095662 A1 | 7/2002 | Ashlock et al. | 717/136 |
| 2002/0097953 A1 | 7/2002 | Kline | 385/24 |
| 2002/0098867 A1 | 7/2002 | Meiksen et al. | 455/560 |
| 2002/0105413 A1 | 8/2002 | Cern | 340/310.01 |
| 2002/0110310 A1 | 8/2002 | Kline | 385/15 |
| 2002/0110311 A1 | 8/2002 | Kline | 385/15 |
| 2003/0007576 A1 | 1/2003 | Alavi et al. | 375/329 |
| 2003/0090368 A1 | 5/2003 | Ide | 340/310.06 |
| 2003/0103307 A1 | 6/2003 | Dostert | 361/113 |
| 2003/0107477 A1 | 6/2003 | Ide | 340/310.01 |
| 2003/0149784 A1 | 8/2003 | Ide | 709/231 |
| 2003/0184433 A1 | 10/2003 | Zalitzky et al. | 340/310.06 |
| 2003/0232599 A1 | 12/2003 | Dostert | 455/66.1 |
| 2004/0001438 A1 | 1/2004 | Aretz | 370/232 |
| 2004/0037317 A1 | 2/2004 | Zalitzky et al. | 370/466 |

FOREIGN PATENT DOCUMENTS

| | | |
|---|---|---|
| DE | 100 08 602 A1 | 6/2001 |
| DE | 100 12 235 C2 | 12/2001 |
| DE | 100 47 648 A1 | 4/2002 |
| DE | 100 61 584 A1 | 6/2002 |
| DE | 100 61 586 A1 | 6/2002 |
| DE | 101 00 181 A1 | 7/2002 |
| DE | 101 03 530 A1 | 8/2002 |
| DE | 100 59 564 A1 | 9/2002 |
| DE | 100 48 348 C2 | 11/2002 |
| DE | 101 190 039 A1 | 12/2002 |
| DE | 101 190 040 A1 | 12/2002 |
| DE | 100 26 930 C2 | 1/2003 |
| DE | 100 26 931 C2 | 1/2003 |
| DE | 100 42 958 C2 | 1/2003 |
| DE | 101 47 918 A1 | 4/2003 |
| DE | 101 47 916 C1 | 5/2003 |
| DE | 101 46 982 C1 | 6/2003 |
| DE | 101 47 915 C1 | 6/2003 |

| | | | |
|---|---|---|---|
| DE | 101 47 913 C1 | 7/2003 |
| EP | 0 141 673 A2 | 5/1985 |
| EP | 0 581 351 A1 | 2/1994 |
| EP | 0 632 602 A2 | 1/1995 |
| EP | 0 470 185 B1 | 11/1995 |
| EP | 0 822 721 A2 | 2/1998 |
| EP | 0 822 721 A3 | 2/1998 |
| EP | 0 913 955 A2 | 5/1999 |
| EP | 0 933 883 A2 | 8/1999 |
| EP | 0 933 883 A3 | 8/1999 |
| EP | 0 948 143 A2 | 10/1999 |
| EP | 0 959 569 A1 | 11/1999 |
| EP | 1 011 235 A2 | 6/2000 |
| EP | 1 014 640 A2 | 6/2000 |
| EP | 1 043 866 A2 | 10/2000 |
| EP | 1 043 866 A3 | 10/2000 |
| EP | 1 075 091 A1 | 2/2001 |
| EP | 0 916 194 B1 | 9/2001 |
| EP | 1 011 235 A3 | 5/2002 |
| EP | 1 213 849 A1 | 6/2002 |
| EP | 1 217 760 A1 | 6/2002 |
| EP | 1 014 640 A3 | 7/2002 |
| EP | 1 021 866 B1 | 10/2002 |
| EP | 1 251 646 A2 | 10/2002 |
| EP | 1 253 699 A2 | 10/2002 |
| ES | 2 122 920 A1 | 12/1998 |
| FR | 2 326 087 | 7/1976 |
| GB | 1 548 652 | 7/1979 |
| GB | 2 101 857 A | 1/1983 |
| GB | 2 293 950 A | 4/1996 |
| GB | 2 315 937 A | 2/1998 |
| GB | 2 331 683 A | 5/1999 |
| GB | 2 335 335 A | 9/1999 |
| GB | 2 341 776 A | 3/2000 |
| GB | 2 342 264 A | 4/2000 |
| GB | 2 347 601 A | 9/2000 |
| JP | 1276933 | 11/1989 |
| NZ | 276741 | 7/1998 |
| WO | 84/01481 A1 | 4/1984 |
| WO | 90/13950 A2 | 11/1990 |
| WO | 92/16920 A1 | 10/1992 |
| WO | 93/07693 A1 | 4/1993 |
| WO | 95/29536 | 11/1995 |
| WO | 98/01905 A1 | 1/1998 |
| WO | 98/33258 A2 | 7/1998 |
| WO | 98/33258 A3 | 7/1998 |
| WO | 98/40980 A1 | 9/1998 |
| WO | 99/59261 A1 | 11/1999 |
| WO | 00/16496 A2 | 3/2000 |
| WO | 00/59076 A1 | 10/2000 |
| WO | 00/60701 A1 | 10/2000 |
| WO | 00/60822 A1 | 10/2000 |
| WO | 01/08321 A1 | 2/2001 |
| WO | 01/43305 A1 | 6/2001 |
| WO | 01/50625 A2 | 7/2001 |
| WO | 01/50625 A3 | 7/2001 |
| WO | 01/50628 A1 | 7/2001 |
| WO | 01/50629 A1 | 7/2001 |
| WO | 01/63787 A1 | 8/2001 |
| WO | 01/82497 A1 | 11/2001 |
| WO | 02/17509 A1 | 2/2002 |
| WO | 02/37712 A1 | 5/2002 |
| WO | 02/054605 A1 | 7/2002 |
| WO | 02/065684 A2 | 8/2002 |
| WO | 02/089352 A1 | 11/2002 |
| WO | 02/089353 A1 | 11/2002 |
| WO | 03/009083 A2 | 1/2003 |
| WO | 03/009083 A3 | 1/2003 |
| WO | 03/010896 A1 | 2/2003 |
| WO | 03/30396 A2 | 4/2003 |
| WO | 03/034608 A2 | 4/2003 |
| WO | 03/040732 A2 | 5/2003 |
| WO | 03/056715 A1 | 7/2003 |
| WO | 2004/008656 A1 | 1/2004 |
| WO | 2004/021600 A1 | 3/2004 |

OTHER PUBLICATIONS

U.S. Appl. No. 09/805,638, filed Mar. 14, 2001, Kline.
U.S. Appl. No. 09/835,532, filed Apr. 16, 2001, Kline.
U.S. Appl. No. 09/837,972, filed Apr. 19, 2001, Kline et al.
U.S. Appl. No. 09/912,633, filed Jul. 25, 2001, Kline.
U.S. Appl. No. 09/915,459, filed Jul. 26, 2001, Kline.
U.S. Appl. No. 09/924,730, filed Aug. 8, 2001, Kline.
U.S. Appl. No. 10/016,998, filed Dec. 14, 2001, Kline.
U.S. Appl. No. 10/075,708, filed Feb. 14, 2002, Kline.
U.S. Appl. No. 10/075,332, filed Feb. 14, 2002, Kline.
U.S. Appl. No. 10/150,694, filed May 16, 2002, Gidge.
U.S. Appl. No. 10/165,992, filed Jun. 10, 2002, Kline.
U.S. Appl. No. 10/176,500, filed Jun. 21, 2002, Pridmore, Jr. et al.
Patent Abstracts of Japan, Japanese Publication No. 10200544 A2, published Jul. 31, 1998, (Matsushita Electric Works, LTD).
Web Printout: http://www.tohoku-epco.co.jp/profil/kurozu/c_vol8_1/art04.htm Tohoku Electric Power, Co., Inc., "Tohoku Electric Develops High-Speed Communications System Using Power Distribution Lines," *Tohoku Currents*, Spring 1998, 8(1), 2 pages.
International Search Report issued in PCT Application No. PCT/US01/01810, Date of Mailing: May 2, 2001.
International Search Report issued in PCT Application No. PCT/US01/12699, Date of Mailing: Jul. 16, 2001.
International Search Report issued in PCT Application No. PCT/US01/12291, Date of Mailing: Oct. 22, 2001.
International Search Report issued in PCT Application No. PCT/US01/48064, Date of Mailing: Jun. 5, 2002.
Written Opinion issued in PCT Application No. PCT/US01/12699, Date of Mailing: May 15, 2002.
International Search Report issued in PCT Application No. PCT/US02/04310, Date of Mailing: Jun. 24, 2002.
U.S. Appl. No. 10/293,799, filed Nov. 13, 2002, Huebner.
U.S. Appl. No. 10/292,745, filed Nov. 12, 2002, Cope et al.
U.S. Appl. No. 10/292,714, filed Nov. 12, 2002, Cope.
U.S. Appl. No. 10/315,725, filed Dec. 10, 2002, Cope et al.
U.S. Appl. No. 10/319,317, filed Dec. 13, 2002, Mollenkopf et al.
U.S. Appl. No. 10/348,164, filed Jan. 21, 2003, Cope et al.
U.S. Appl. No. 10/385,899, filed Mar. 10, 2003, Mollenkopf.
Power Line Communications Conference entitled, "PLC, A New Competitor in Broadband Internet Access," Dec. 11-12, 2001, Washington, D.C., 60 pages.
Rivkin, S. R., "Co-Evolution of Electric & Telecommunications Networks," *The Electricity Journal*, May 1998, 71-76.
Marketing Assessment Presentation entitled "Powerline Telecommunications," The Shpigler Group for CITI PLT, Jul. 16, 2002, 9 pages.
Campbell, C., presentation entitled "Building a Business Case for PLC: Lessons Learned From the Communication Industry Trenches," KPMG Consulting, Jul. 16, 2002, 5 pages.
"Embedded Power Line Carrier Modem," Archnet Electronic Technology, http://www.archnetco.com/english/product/ATL90.htm, 2001, 3 pages.
"Archnet: Automatic Meter Reading System Power Line Carrier Communication", www.archnetco.com/english/product/product_sl.htm, 3 pages.

"Power Line Communications Solutions", www.echelon.com/products/oem/transceivers/powerline/default.htm, 2 pages.

"Texas Instruments: System Block Diagrams; Power Line Communication (Generic)", http://focus.ti.com/docs/apps/catalog/resources/blockdiagram.jhtml?bdId=638, 1 page.

Feduschak, N.A., "Waiting in the Wings: Is Powerline Technology Ready to Compete with Cable?", Mar. 2001, www.cabletoday.com/ic2/archives/0301/0301powerline.htm, 5 pages.

"Signalling on Low-Voltage Electrical Installations in the Frequency Band 3kHz to 148.5kHz—Part 4: Filters at the Interface of the Indoor and Outdoor Electricity Network", *CLC SC 105A (Secretariat)* May 1992, 62, 1-11.

"Intellon Corporation Test Summary for Transformerless Coupler Study", *Intellon No News Wires*, Dec. 24, 1998, DOT/NHTSA Order No. DTNH22-98-P-07632, pp 1-18.

EMETCON *Automated Distribution System*, ABB Power T & D Company, Inc., Jan. 1990, Raleigh, North Carolina, No B-919A, 14 pages.

"Dedicated Passive Backbone for Power Line Communications", *IBM Technical Disclosure Bulletin*, Jul. 1997, 40(7), 183-185.

Coaxial Feeder Cables [Engineering Notes], *PYE Telecommunications Limited Publication Ref No. TSP507/1*, Jun. 1975, Cambridge, England, 15 pages.

"Centralized Commercial Building Applications with the Lonworks ® PLT-21 Power Line Transceiver", *Lonworks Engineering Bulletin*, Echelon, Apr. 1997, pp 1-22.

Plexeon Logistics, Inc., "Power Line Communications", www.plexeon.com/power.html, 2 pages.

"EMETCON Automated Distribution System: Communications Guide", *Westinghouse ABB Power T & D Company Technical Manual 42-6001A*, Sep. 1989, 55 pages.

Abraham, K.C. et al., "A Novel High-Speed PLC Communication Modem", *IEEE Transactions on Power Delivery*, 1992, 7(4), 1760-1768.

J.M. Barstow., "A Carrier Telephone System for Rural Service", *AIEE Transactions*, 1947, 66, 301-307.

Chang, S.S.L., "Power-Line Carrier", *Fundamentals Handbook of Electrical and Computer Engineering*, Volume II—Communication, Control, Devices and Systems, John Wiley & Sons, 617-627.

Chen, Y-F. et al. "Baseband Transceiver Design of a 128-Kbps Power-Line Modem for Household Applications", *IEEE Transactions on Power Delivery*, 2002, 17(2), 338-344.

Coakley, N.G. et al., "Real-Time Control of a Servosystem Using the Inverter-Fed Power Lines to Communicate Sensor Feedback", *IEEE Transactions on Industrial Electronics*, 1999, 46(2), 360-369.

Esmailian, T. et al., "A Discrete Multitone Power Line Communication System", *Department of Electrical and Computer Engineering*, University of Toronto, Ontario Canada, 2000 IEEE, pp 2953-2956.

Kawamura, A. et al., "Autonomous Decentralized Manufacturing System Using High-speed Network with Inductive Transmission of Data and Power", *IEEE*, 1996, 940-945.

Kilbourne, B. "EEI Electric Perspectives: The Final Connection", www.eei.org/ep/editorial/Jul-01/0701conenct.htm, 7 pages.

Kim, W-O., et al., "A Control Network Architecture Based on EIA-709.1 Protocol for Power Line Data Communications", *IEEE Transactions on Consumer Electronics*, 2002, 48(3), 650-655.

Lim, C.K. et al., "Development of a Test Bed for High-Speed Power Line Communications", School of Electrical and Electronic Engineering, Nanyang Technological University, Singapore, *IEEE*, 2000, 451-456.

Lokken, G. et al., "The Proposed Wisconsin electric Power Company Load Management System Using Power Line Carrier Over Distribution Lines", *1976 National Telecommunications Conference, IEEE*, 1976, 2.2-12.2-3.

Marthe, E. et al., "Indoor Radiated Emission Associated with Power Line Communication Systems", *Swiss Federal Institute of Technology Power Systems Laboratory IEEE*, 2001, 517-520.

Naredo, J.L. et al., "Design of Power Line Carrier Systems on Multitransposed Delta Transmission Lines", *IEEE Transactions on Power Delivery*, 1991, 6(3), 952-958.

Nichols, K., "Build a Pair of Line-Carrier Modems", *CRC Electronics-Radio Electronics*, 1988, 87-91.

Okazaki, H, et al., "A Transmitting, and Receiving Method for CDMA Communications Over Indoor Electrical Power Lines", *IEEE*, 1998, pp VI-522—VI-528.

B. Don Russell, "Communication Alternatives for Distribution Metering and Load Management", *IEEE Transactions on Power Apparatus and Systems*, 1980, vol. PAS-99(4), pp 1448-1455.

Sado, WN. et al., "Personal Communications on Residential Power Lines—Assessment of Channel Parameters", *IEEE*, 532-537.

International Search Report dated Aug. 7, 2002, from PCT/US02/04300.

LONWORKS Engineering Bulletin, "Demand Side Management with LONWORKS® Power Line Transceivers," Dec. 1996, 36 pages.

HomePlug™Powerline Alliance, HomePlug Initial Draft Medium Interface Specification, May 19, 2000, 109 pages.

HomePlug™Powerline Alliance, HomePlug 0.5 Draft Medium Interface Specification, Nov. 28, 2000, 133 pages.

HomePlug™Powerline Alliance, HomePlug Initial Draft Medium Interface Specification, Jul. 27, 2000, 109 pages.

HomePlug™Powerline Alliance, HomePlug 1.01 Specification, Dec. 1, 2001, 139 pages.

Summary of an IEEE Guide for Power-Line Carrier Applications, A Report by the Power System Communications Committee, *IEEE Transactions on Power Apparatus and Systems*, vol. PAS-99, No. 6, Nov./Dec. 1980, pp. 2334-2337.

De Wilde, W. R. et al., "Upwards to a Reliable Bi-Directional Communication Link on the LV Power Supplies for Utility Services: Field Tests in Belgium," Apr. 3-5, 1990, *Sixth International Conference on*, Manchester, UK, pp. 168-172.

Tanaka, M., "Transmission Characteristics of a Power Line Used for Data Communications at High Frequencies," IEEE Transactions on Consumer Electronics, Feb. 1989, vol. 35, No. 1, pp. 37-42.

Hasler, E. F. et al., "Communication Systems Using Bundle Conductor Overhead Power Lines," IEEE Transactions on Power Apparatus and Systems, Mar./Apr. 1975, vol. PAS-94, No. 2, pp. 344-349.

IEEE Guide for Power-Line Carrier Applications, ANSI/IEEE Std 643-1980, ©1980 by The Institute of Electrical and Electronics Engineers, Inc., pp. 1-80.

Hatori, M. et al., "Home Informatization and Standardization of Home Bus," IEEE Transactions on Consumer Electronics, Aug. 1986, vol. CE-32, No. 3, pp. 542-549.

Hunt, J. M. et al., "Electrical Energy Monitoring and Control System for the Home," IEEE Transactions on Consumer Electronics, Aug. 1986, vol. CE-32, No. 3, pp. 578-583.

Gutzwiller, F. W. et al., "Homenet: A Control Network for Consumer Applications," IEEE Transactions on Consumer Electronics, Aug. 1983, vol. CE-29, No. 3, pp. 297-304.

Burrascano, P. et al., "Digital Signal Transmission on Power Line Carrier Channels: An Introduction," IEEE Transactions on Power Delivery, Jan. 1987, vol. PWRD-2, No. 1, pp. 50-56.

Burr, A. G. et al., "Effect of HF Broadcast Interference on PowerLine Telecommunications Above 1 Mhz," ©1998 IEEE, pp. 2870-2875.

Onunga, J. et al., "Distribution Line Communications Using CSMA Access Control with Priority Acknowledgements," IEEE Transactions on Power Delivery, Apr. 1989, vol. 4, No. 2, pp. 878-886.

Tanaka, M., "High Frequency Noise Power Spectrum, Impedance and Transmission Loss of Power Line in Japan on Intrabuilding Power Line Communications," *IEEE Transactions on Consumer Electronics*, May 1988, vol. 34, No. 2, pp. 321-326.

Meng, H. et al., "A Transmission Line Model for High-Frequency Power Line Communication Channel," ©2002 IEEE, pp. 1290-1295.

Burrascano, P. et al., "Performance Evaluation of Digital Signal Transmission Channels on Coronating Power Lines," ©1988 IEEE, pp. 365-368.

DiClementi, D. A. et al., "Electrical Distribution System Power Line Characterization," ©1996 IEEE, pp. 271-276.

Abraham, K. C. et al., "A Novel High-Speed PLC Communication Modem," IEEE Transactions on Power Delivery, Oct. 1992, vol. 7, No. 4, pp. 1760-1768.

Yoshitoshi, M. et al., "Proposed Interface Specifications for Home Bus," IEEE Transactions on Consumer Electronics, Aug. 1986, vol. CE-32, No. 3, pp. 550-557.

O'Neal, Jr., J. B., "The Residential Power Circuit as a Communication Medium," IEEE Transactions on Consumer Electronics, Aug. 1986, vol. CE-32, No. 3, pp. 567-577.

Dostert, K., "EMC Aspects of High Speed Powerline Communications," Proceedings of the 15$^{th}$ International Wroclaw Symposium and Exhibition on Electromagnetic Capability, Jun. 27-30, 2000; Wroclaw, Poland, pp. 98-102.

Piety, R. A., "Intrabuilding Data Transmission Using Power-Line Wiring," Hewlett-Packard Journal, May 1987, pp. 35-40.

"ABB Joins Main.net's subsidiary, PPC, as shareholder and strategic partner for Power Line Communications," Mannheim, Germany/Kfar Saba, Israel, Oct. 8th, 2002, 2 pages.

Dostert, K., Powerline Communications, Ch. 5, pp. 286, 288-292, Prentice Hall PTR, Upper Saddle River, NJ ©2001.

Liu, E. et al., "Broadband Characterization of Indoor Powerline Channel," Communications Laboratory, Helsinki University of Technology, Finland [presented at the 2004 International Symposium on PowerLine Communications and its Applications, Zaragoza, Spain. Mar. 31-Apr. 2, 2004] 6 pages.

* cited by examiner

FACILITATING COMMUNICATION OF DATA SIGNALS ON ELECTRIC POWER SYSTEMS

TECHNICAL FIELD OF THE INVENTION

The present invention relates to data communications, and more particularly to broadband data communication systems using underground and aerial electrical power cables.

BACKGROUND OF THE INVENTION

Recently, several technologies that provide broadband data access have entered the market. These technologies include digital subscriber lines (DSL), cable modems, and wireless networks, among others. Another emerging technology uses existing electrical power distribution networks to carry high-frequency data signals to and from individual customer premises. Such systems may be referred to throughout as "power line communication systems." Because electrical power distribution networks were designed to carry low-frequency high-voltage signals, however, transmitting higher frequency data signals often face obstacles not confronted by their lower frequency counterparts.

Many components create such obstacles to the higher frequency data signal. One particular element in the electrical power distribution network that creates a particular hindrance to the data signal is the electrical transformer. The transformer is an integral element in the electrical power distribution system that has been designed to efficiently step-down voltage to values consistent with customer equipment, while providing the necessary isolation and protection from higher voltage values. However, the efficiencies that have been designed to handle the voltage signals often have a detrimental consequence for the previously unanticipated transmission of data signals. Therefore, while the transformer provides a critical function for the transmission of low frequency power, it often creates an obstacle in the transmission of higher frequency data signals.

One particular impediment to the transmission of data signals is created by the inherent characteristics of the transformer itself. Typically, the construction of a transformer is such that its characteristic impedance for higher frequency data signals is significantly lower than the impedance encountered on the customer premise side of the transformer (e.g., local distribution lines and customer premise equipment). As a result, if a communications signal is injected at the transformer, a significant portion of the higher frequency data signal follows the path of least resistance directly into the transformer, instead of ideally traveling over the distribution lines and onto the customer premise. As a result, a great deal of the data signal's strength is lost to the transformer and never reaches the customer premise. This condition is found in most transformer units because the electrical power distribution network, of course, was designed without the concern of transmitting higher frequency data signals.

Therefore, there is a need to reduce the loss of the higher frequency data signals communicated on the electrical power distribution system.

SUMMARY OF THE INVENTION

The invention includes a method, system, and device for communicating a data signal on an electric power system. The inventive method includes communicating the data signal to the electric power system, and modifying the characteristics of the electric power system to reduce the data signal communicated to an electrical component located on the electric power system without substantially reducing a voltage signal. The method further includes communicating the data signal to a customer premise. The electrical component may include, for example, an electrical transformer. The modification of the characteristics of the electric power system may include increasing an impedance imposed by the transformer on the data signal. The impedance may be increased by increasing inductive properties of the transformer, for example, by using an inductor and/or adding one or more ferrite cores to the electric power system. The method also may increase an impedance from the transformer to a point at which the data signal is provided to the network. The inventive method also may apply to other electrical components such as a capacitor bank, a switch tap, a service entrance, a voltage sensing device, and an electrical measurement device. The data may have a frequency substantially in the range of 1 to 100 Mega Hertz, while the voltage signal may have a frequency substantially in the range of 0 to 100 Hertz.

BRIEF DESCRIPTION OF THE DRAWINGS

Other features of the invention are further apparent from the following detailed description of the embodiments of the invention taken in conjunction with the accompanying drawings, of which.

DETAILED DESCRIPTION OF THE INVENTION

Overview of Electric Power Transmission/Distribution System

Figure 1:
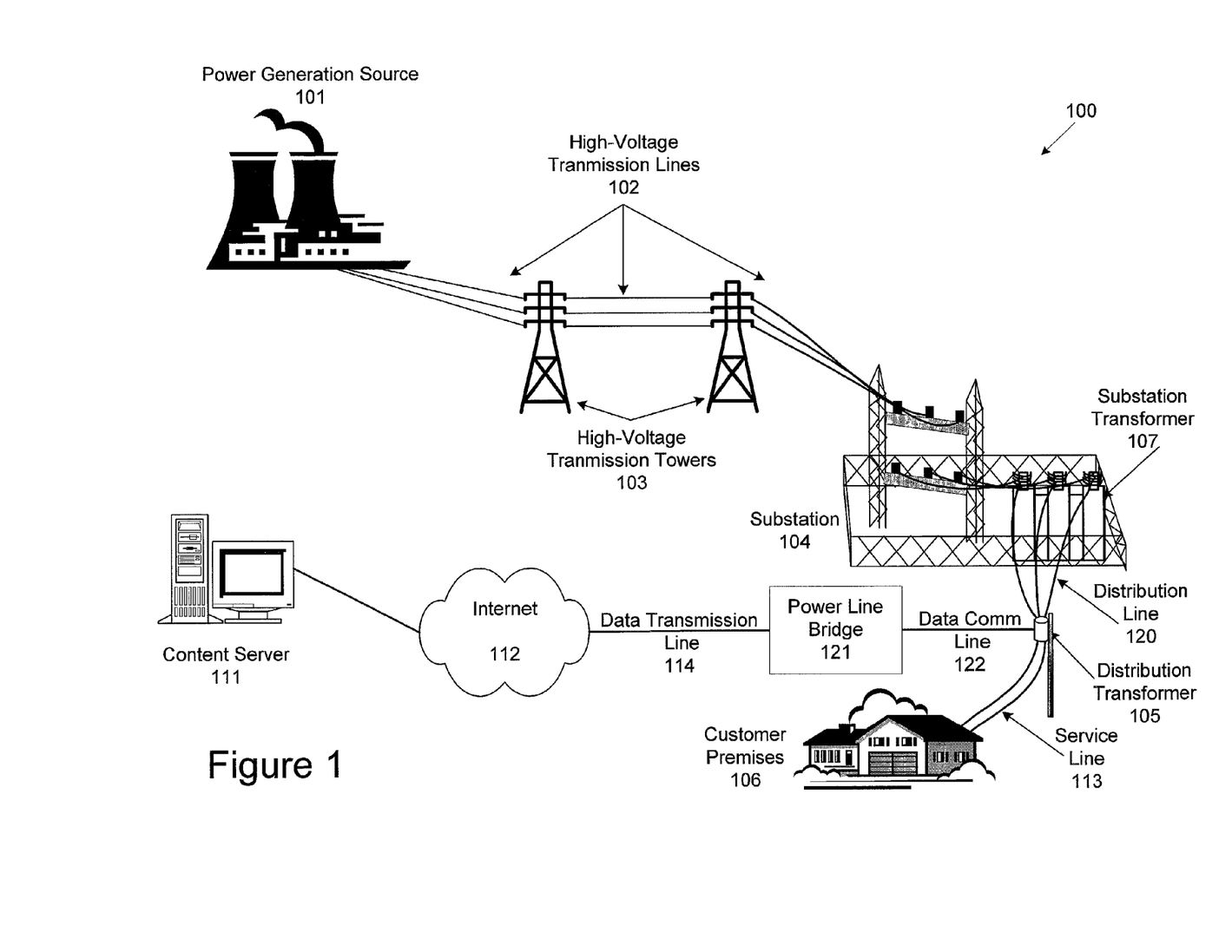
FIG. 1 is a block diagram of an electric power and data transmission system.

FIG. 1 is a block diagram of an electric power and data transmission system 100. Generally, electric power and data transmission system 100 has three major components: the generating facilities that produce the electric power, the transmission network that carries the electric power from the generation facilities to the distribution points, and the distribution system that delivers the electric power to the consumer. As shown in FIG. 1, a power generation source 101 is a facility that produces electric power. Power generation source 101 includes a generator (not shown) that creates the electrical power. The generator may be a gas turbine or a steam turbine operated by burning coal, oil, natural gas, or a nuclear reactor, for example. In each case, power generation source 101 provides a three-phase AC power. The AC power typically has a voltage as high as approximately 25,000 volts.

A transmission substation (not shown) then increases the voltage from power generation source 101 to high-voltage levels for long distance transmission on high-voltage transmission lines 102. Typical voltages found on high-voltage transmission lines 102 range from 69 to in excess of 800 kilovolts (kV). High-voltage transmission lines 102 are supported by high-voltage transmission towers 103. High-voltage transmission towers 103 are large metal support structures attached to the earth, so as to support the transmission lines and provide a ground potential to system 100. High-voltage transmission lines 102 carry the electric power from power generation source 101 to a substation 104.

Generally, a substation acts as a distribution point in system 100 and provide a point at which voltages are stepped-down to reduced voltage levels. Substation 104 converts the power on high-voltage transmission lines 102 from transmission voltage levels to distribution voltage levels. In particular, substation 104 uses transformers 107 that step down the transmission voltages from the 69–800 kV level to distribution voltages that typically are less than 35 kV. In addition, substation 104 may include an electrical bus (not shown) that serves to route the distribution level power in multiple directions. Furthermore, substation 104 often includes circuit breakers and switches (not shown) that permit substation 104 to be disconnected from high-voltage transmission lines 102, when a fault occurs on the lines.

Substation 104 typically is connected to at least one distribution transformer 105. Distribution transformer 105 may be a pole-top transformer located on a utility pole, a pad-mounted transformer located on the ground, or a transformer located under ground level. Distribution transformer 105 steps down the voltage to levels required by a customer premise 106, for example. Power is carried from substation transformer 107 to distribution transformer 105 over one or more distribution lines 120. Power is carried from distribution transformer 105 to customer premise 106 via one or more service lines 113. Voltages on service line 113 typically range from 240 volts to 440 volts. Also, distribution transformer 105 may function to distribute one, two or all three of the three phase currents to customer premise 106, depending upon the demands of the user. In the United States, for example, these local distribution transformers typically feed anywhere from 1 to 10 homes, depending upon the concentration of the customer premises in a particular location.

Distribution transformer 105 also may be in communication with a power line bridge 121. Power line bridge 121 facilitates the transmission of data to electric power and data transmission system 100 over a data communication line 122. Power line bridge 121 may receive such data from a content server 111 over the Internet 112 via a data transmission line 114. Although not shown in FIG. 1, it should be appreciated that power line bridge 121 may receive data using a number of other techniques including wireless network transmission, for example. Also, power line bridge 121 may receive data that previously has been placed on electric power and data transmission system 100 at distribution line 120 and/or at high-voltage transmission lines 102, for example. In this way, data signals may be provided to customer premise 106 via a service line 113, which typically is used to carry electrical power from distribution transformer 105 to customer premise 106. Typically, these data signals will be in a different frequency range, usually higher, than the electrical power traditionally provided over service line 113.

Transmitting Data Over the Electric Power Transmission/Distribution System

Figure 2A:
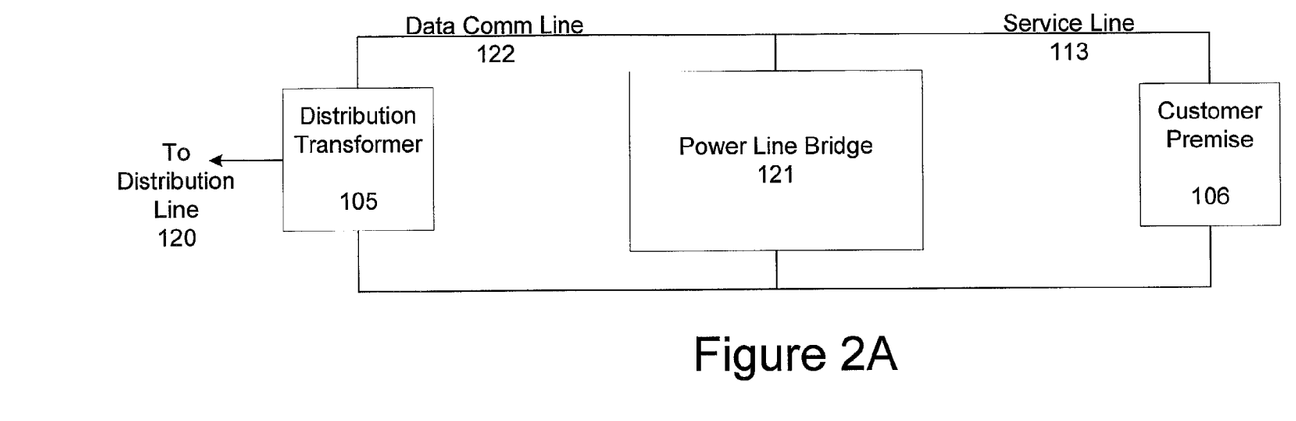
FIGS. 2A and 2B provide a circuit diagram of the electric power and data transmission system.
Figure 2B:
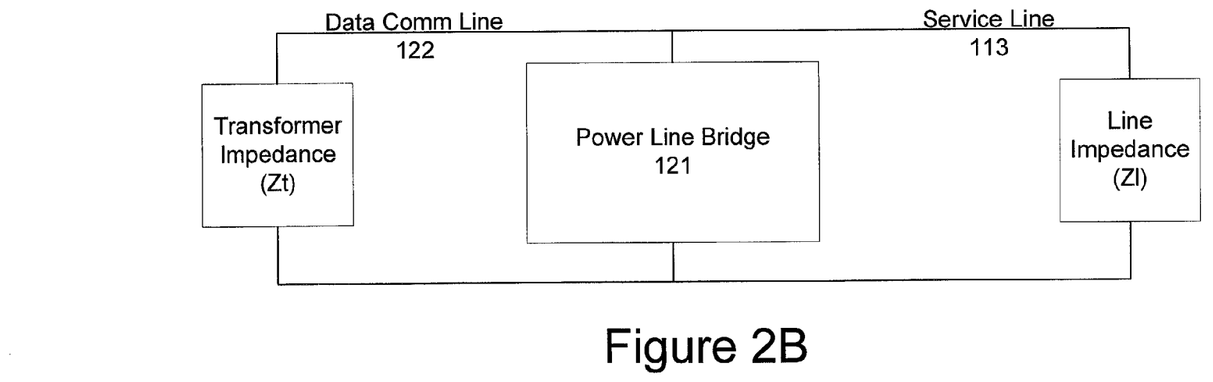

Transmitting the higher frequency data signals to customer premise 106 over service line 113 requires overcoming certain impediments inherent in electric power and data transmission system 100. FIGS. 2A and 2B provide a circuit diagram of part of electric power and data transmission system 100, and further details certain impediments faced by the data signal. It should be appreciated that the circuit diagrams illustrated in FIGS. 2A and 2B have been simplified for the purposes of clarity and brevity. In practice, many other circuit features may be required to fully describe the system.

As shown in FIG. 2A, power line bridge 121 is in a parallel circuit arrangement with both distribution transformer 105 and customer premise 106. Furthermore, data communication line 122 couples power line bridge 121 with distribution transformer 105, and service line 113 couples power line bridge 121 with customer premise 106. It follows, therefore, that the impedance of distribution transformer 105, customer premise 106, and service line 113 also will each be in parallel with power line bridge 121. Although power line bridge 121 is shown in parallel with distribution transformer 105 and customer premise 106, it should be appreciated that other circuit configurations also are contemplated by the invention, depending upon the precise nature of the power line bridge device. For example, the invention applies equally where power line bridge 121 is in series with customer premise 106 and/or with distribution transformer 105.

FIG. 2B provides a circuit diagram of the corresponding impedances of the circuit shown in FIG. 2A. As shown in FIG. 2B, a first impedance, $Z_t$, represents the inherent impedance that the higher frequency data signal faces from distribution transformer 105, itself. A second impedance, $Z_l$, represents the impedance that the higher frequency data signal faces on the load side of distribution transformer 105. In particular, $Z_l$ may comprise the impedance caused by a combination of many elements, including the load at customer premise 106 and the characteristic impedance of service line 113, for example.

The precise values of these impedances will vary widely depending upon location-specific variables, including equipment (e.g., transformer make and model) and the type of customer premise (e.g., residential, commercial, and industrial). Regardless of their precise values, however, basic principles of electrical theory well known to those skilled in the art dictate that when $Z_l$ is significantly greater than $Z_t$, the data signal will follow the path of least resistance and be shunted significantly over distribution transformer 105. As a result, a significant portion of the data signal will be lost in distribution transformer 105 and thus be prevented from being transmitted to customer premise 106, as desired. Therefore, in order to maximize the data signal provided to customer premise, $Z_t$ should be significantly greater than $Z_l$, or effectively be made to be so to the data.

The magnitude of $Z_l$ is determined, for example, by the characteristic impendance of service line 113 and by the impedance of the load at customer premise 106. The characteristic impedance of a cable is well known to those skilled in the art to be equal to $(L \times C)^{0.5}$, where L represents the unit inductance and C the unit capacitance of the cable. In buried underground power distribution cables, for example, this characteristic impedance is typically between 15 and 25 ohms. The load at customer premise 106 may vary significantly with wiring differences and other site-specific circumstances, but tupically is above 20 ohms. Therefore, generally, the overall impedance $Z_l$ may vary from 15 ohms to several hundred ohms.

The value of transformer impedance $Z_t$ depends upon various factors including the construction of distribution transformer 105. Also, it should be appriciated that impedance may be related to other electrical components in the electrical system, other than the distribution transformer 105. As part of their everyday operation, power distribution transformers use windings and heavy iron cores to minimize power loss and safely handle large supply currents. These inherent characteristics of the transformer's construction create a potentially large composite winding capacitance. The large capacitance does not introduce problems, such as power loss, for traditional signals at lower frequencies, like electrical power operating at 50 or 60 hertz (Hz). However, the large capacitance introduces significantly low impendance at higher frequincies, like 1 MHz to 100 MHz that may be used for transmitting data signals, for example. While internal series inductances of the transformer can partially mitigate the adverse effect of the capacitance, these inductances are typically small (i.e., less than 600 nanohenries). Therefore, the impedance is dominated by the capacitance of the transformer's windings. Accordingly, the capacitance of the transformer windings create a path of least resistance, and thus cause a significant loss of the higher frequency data signal by diverting the data signal away from customer premise 106.

Figure 3:
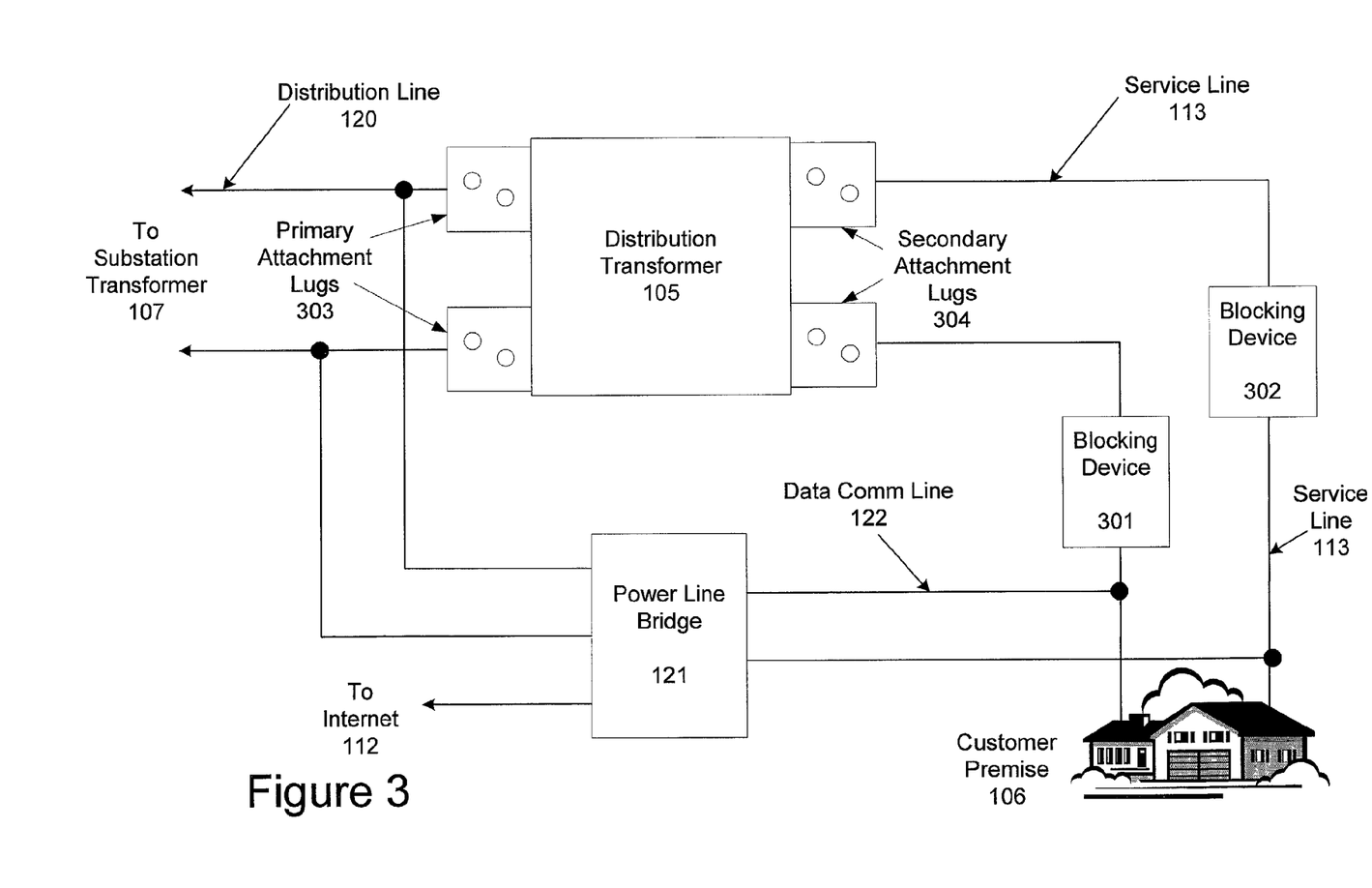
FIG. 3 is a block diagram further detailing the power line communications system, according to the invention.

FIG. 3 is a block diagram further detailing the relevant portions of electric power and data transmission system 100. It should be appreciated that other components may be required to transmit a data signal over electric power and data transmission system 100. However, the components depicted in the block diagram of FIG. 3 are shown as such for purposes of clarity and brevity. Also, it should be appreciated that components other than distribution transformer 105 are contemplated by the invention.

As shown in FIG. 3, power line bridge 121 is in communication with Internet 112 and with distribution line 120. Power line bridge 121 also is in communication with service line 113. Power line bridge 121 may receive a data signal directly from Internet 112 and provide it to customer premise 106. Also, power line bridge 121 may receive a data signal from distribution line 120. In this case, for example, distribution line 120 may operate as a local area network or wide area network to carry data signals. Where the data signal is provided over distribution line 120, power line bridge 121 provides a communication path over data communication line 122 and around distribution transformer 105. In either case, power line bridge 121 provides the data signals to service line 113, and onto customer premise 106.

Distribution transformer 105 has both primary attachment lugs 303 and secondary attachment lugs 304. Primary attachment lugs 303 are located on the "supply" side or primary side of distribution transformer 105 and permit distribution transformer 105 to receive power, for example, from substation transformer 107. Secondary attachment lugs 304 are located on the "load" side or secondary side of distribution transformer 105 and permit distribution transformer 105 to provide power, for example, to customer premise 106. Although two attachment lugs each are shown on the primary and secondary side of distribution transformer 105 for the purpose of clarity and brevity, it should be appreciated that any number of attachment points may be available.

Each of secondary attachment lugs 304 is in communication with blocking devices 301 and 302. Blocking devices 301 and 302 also are in communication with customer premise 106 and power line bridge 121. Blocking devices 301 and 302 operate to modify the characteristics of electric power and data transmission system 100 so as to reduce the portion of data signal transmitted to distribution transformer 105, and to correspondingly increase the amount of data signal provided to customer premise 106 over service line 113. Therefore, when power line bridge 121 provides a data signal to data communication line 122, blocking devices 301 and/or 302 operate to resist the flow of the data signal to distribution transformer 105 and to persuade the flow of the data signal to customer premise 106.

Although two blocking devices, 301 and 302 are shown in FIG. 3, it should be appreciated that any number of blocking devices may be used, depending upon the particular application. For example, in certain applications the data signal may be sent over just one service line 113, and so perhaps just one corresponding blocking device is required. Alternatively, in certain applications data signal may be sent over two or more service lines, and therefore one or more blocking devices may be required. Moreover, in certain applications, a blocking device may not be required for each service line that transmits a data signal.

Although blocking devices 301 and 302 are shown in FIG. 3 as located between distribution transformer 105 and customer premise 106, it should be appreciated that these devices similarly may be located in other locations. Also, blocking devices 301 and 302 may be located in series on the supply side of distribution transformer 105, for example, in communication with primary attachment lugs 303. Therefore, the invention is not limited to a particular location of the blocking devices within the electrical power system.

Although the data signal may be provided at any point in electric power and data transmission system 100, in practice, it may be desirable for the data signal to be provided at a point that is relatively free of signal interference. Such signal interference typically is created by traditional electrical power system components, like electrical transformers and parallel capacitor banks, for example. Typically, therefore, the data signal is coupled at a point located between local distribution transformer 105 and customer premise 106. Often, economic and ease-of-installation concerns dictate that the coupling take place as close to distribution transformer 105 as possible, typically on the customer premise side of the transformer (i.e., the transformer secondary side).

Also, it should be appreciated that the particular method used to resist the flow of the data signal to the distribution transformer and to persuade the flow of the data signal to the customer premise is not limited to a particular technique. The invention contemplates various techniques based on the particular characteristics of the data signal, and the manufacture of the transformer. For example, in one embodiment, blocking devices 301 and 302 may resist the flow of the data signal to the distribution transformer by increasing the inductance of distribution transformer 105 as seen by the data signal.

Increasing the inductive properties of distribution transformer 105 may be desirable where the data signal operates at a significantly higher frequency than the traditional power signal that typically operates at approximately 50 to 60 Hz. In this embodiment, increasing the inductance of the distribution transformer 105 as seen by the data signal serves the dual purpose of impeding the higher frequency data signal from entering distribution transformer 105, while continuing to provide a lower impedance to the traditional lower frequency power signal.

Figure 4:
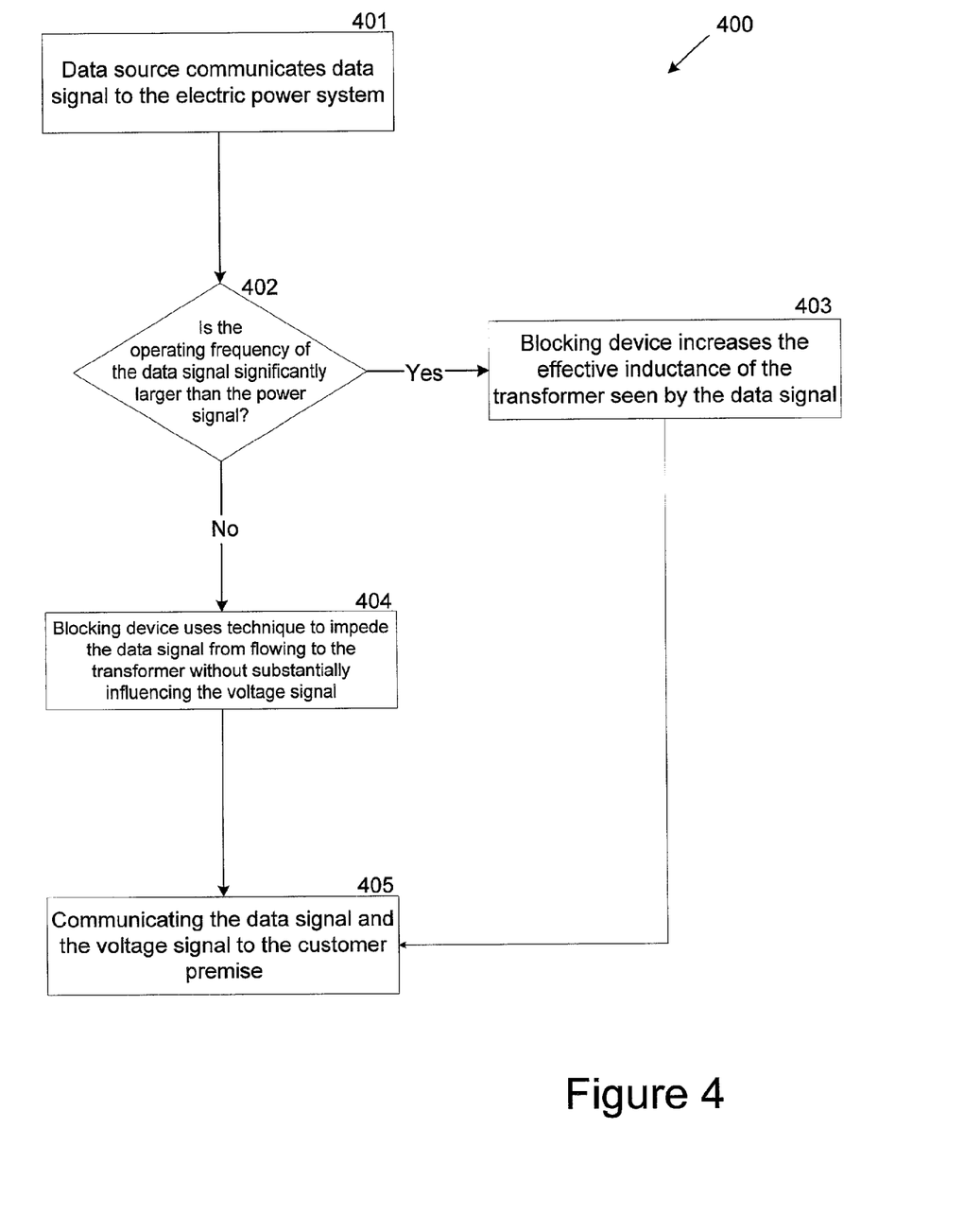
FIG. 4 is a flow diagram of a method of transmitting a data signal on an electric power system, according to the invention.

FIG. 4 is a flow diagram of a method 400 of transmitting a data signal on electric power and data transmission system 100. In step 401, power line bridge 121 communicates the data signal to electric power and data transmission system 100 via data communication line 122. As discussed, the data signal may be provided at any point in electric power and data transmission system 100.

In step 402, it is determined whether the operating frequency of the data signal is significantly larger than the frequency of the power signal. Typically, in wideband data transmission scenarios the data signal is in the range of 1 MHz to 100 MHz and the voltage signal is approximately 60 Hz. In this instance, one method for preventing the data signal from being sent to distribution transformer 105 is by using a blocking device to effectively increase the inductance of the distribution transformer 105 as seen by the data signal, in step 403. Such an increase in inductance operates to prevent the data signal from flowing to distribution transformer 105, while permitting the voltage signal to flow without additional loss of power.

It should be appreciated that other methods for preventing the flow of the data signal to distribution transformer 105 are contemplated. For example, in step 402, where the operating frequency of the data signal is not significantly larger than the frequency of the voltage signal, other techniques may be used to impede the flow of the data signal to distribution transformer 105 without substantially influencing the flow of the voltage signal. These specific techniques will be based on the characteristics of the data signal and the voltage signal, as well as the desired power transmission quantities of the data and voltage signals. In either case, in step 405, the data signal and the voltage signal are communicated with customer premise 106.

Figure 5:
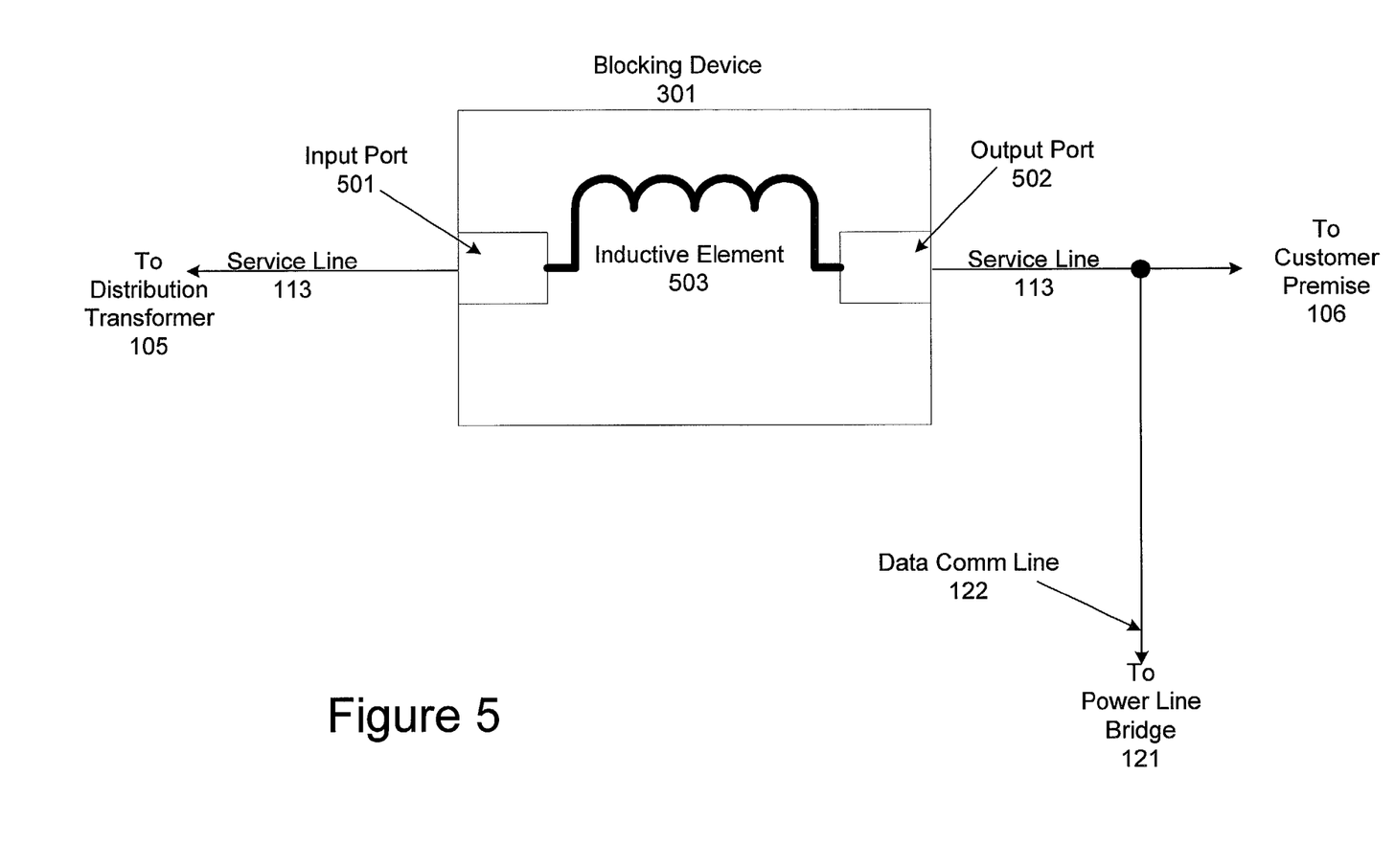
FIG. 5 is a block diagram detailing one example of a blocking device.

FIG. 5 is a block diagram detailing one example of blocking device 301. Although not illustrated in FIG. 5, it should be appreciated that blocking device 302 may be similarly configured. Moreover, while blocking device 301 is shown in FIG. 5 having an inductive element, it should be equally appreciated that other possible configurations are contemplated, depending upon the characteristics of electric power and data transmission system 100, as well as the characteristics of the data signal and voltage signal.

As shown in FIG. 5, blocking device 301 includes an input port 501 and an output port 502. In one embodiment, an inductive element 503 is in communication with input port 501 and output port 502. Input port 501 receives the voltage signal from distribution transformer 105 via service line 113. Output port 502 provides the voltage signal to customer premise 106 via service line 113. In addition, output port 502 may receive a portion of the data signal provided by power line bridge 121 via data communication line 122.

Inductive element 503 in blocking device 301 is selected to have properties that reduce the portion of the data signal directed to distribution transformer 105, and to correspondingly increase the portion of the data signal provided to customer premise 106. Accordingly, the characteristics of the inductive element 503 will vary with the particular circumstances. For example, where the voltage signal operates at or near 60 Hz, and where the data signal has a frequency substantially in the range of 1 MHz to 100 MHz, inductive element 503 may be approximately 8 microhenries. This one example of a value for inductive element 503 provides an impedance of 50 ohms for 1 MHz signals, yet only 3 milliohms for 60 Hz signals, for example. Therefore, the 8 microhenry inductive element provides a low impedance for the 60 Hz voltage signal allowing unimpeded flow of electric power, while providing a higher impedance for the 1 MHz data signal and impeding the flow of the data signal into distribution transformer 105.

As is well known to those skilled in the art, because a single winding of a conductor passing through a ferrite core creates an inductance greater than that of the conductor alone, it may be desirable to vary the inductive properties of the transformer as seen by the data signal by applying such a configuration to one or more components of distribution transformer 105. Moreover, the size and magnetic properties of the ferrite material may be manipulated to ensure the desired inductance is created.

Although an inductive element 503 has been described in FIG. 5, it should be appreciated that the invention is not so limited. In particular, other elements, perhaps non-inductive or partially so, may be used to restrict the flow of the data signal to distribution transformer 105. The types of other elements used may vary depending on the characteristics of the data signal and the voltage signal, the permissible loss of the voltage signal, and the required power level of the data signal to be transmitted to customer premise 106. The types of elements may also vary depending on the characteristics of the electrical components, the type of compoents (e.g., distribution transformer and capacitor bank) and the nature of the portion of the electrical power system under consideration (e.g., medium voltage and high voltage).

As discussed, the secondary attachment lugs of distribution transformer 105 provide one possible location to attach a blocking device to electric power and data transmission system 100. This is particularly true for underground power distribution systems, where distribution transformer 105 is a pad-mount transformer, because secondary attachment lugs 304 of distribution transformer 105 are one of the few locations where service line 113 is not underground, and thus readily accessible. In this embodiment, therefore, it may be practically desirable from an implementation perspective to effectively increase the impedance, for example, of distribution transformer 105 by locating a ferrite material, perhaps in the form of a blocking device, around secondary attachment lugs 304. In particular, the ferrite material may be constructed such that it clamps over service line 113 at distribution transformer 105 and/or at secondary attachment lug 304. This technique provides a method for dissuading the data signal from flowing to distribution transformer 105, while facilitating modification and installation to a transformer that is already in service in the field.

Although this is one possible technique, it should be appreciated that other techniques are contemplated by the invention. For example, a ferrite core could be added to the internal leads located between the core of distribution transformer 105 and its primary 303 or secondary 304 attachment lugs. Because distribution transformer 105 typically is required to be sealed to prevent weather conditions from effecting its operation, this modification typically would take place at the time of manufacture, and provides a possible additional noise suppression feature to the transformer.

In addition to facilitating the flow of the data signal to customer premise 106, inductive element 503 may operate to prevent electromagnetic interference or noise that often propagates between the primary and secondary windings of distribution transformer 105. As a result, the electromagnetic interference typically provided on service line 113 by distribution transformer 105 may be prevented from being coupled via service line 113 to customer premise 106, disrupting appliances or communications equipment in customer premise 106. Also, electromagnetic noise generated by customer premise 106 may be prevented from entering the secondary windings of distribution transformer 105 and being carried onto distribution line 120 where it may be radiated and undesirably interfere with users of the radio frequency spectrum.

The invention is directed to a system and method for communicating a data signal on an electric power system. It is noted that the foregoing examples have been provided merely for the purpose of explanation and are in no way to be construed as limiting of the invention. While the invention has been described with reference to certain embodiments, it is understood that the words that have been used herein are words of description and illustration, rather than words of limitation. For example, the invention may apply equally to other electrical system components other than a transformer, as well as being applied to any part of electric power and data transmission system 100. For example, although the invention is described with respect to a transformer, it should be appreciated that the invention may be applied equally to other electrical components such as capacitor banks, switch taps, service entrances, voltage sensing devices, and electrical measurement equipment. Further, although the invention has been described herein with reference to particular means, materials and embodiments, the invention is not intended to be limited to the particulars disclosed herein. Rather, the invention extends to all functionally equivalent structures, methods and uses, such as are within the scope of the appended claims.

Those skilled in the art, having the benefit of the teachings of this specification, may effect numerous modifications thereto and changes may be made without departing from the scope and spirit of the invention in its aspects. Those skilled in the art will appreciate that various changes and adaptations of the invention may be made in the form and details of these embodiments without departing from the true spirit and scope of the invention as defined by the following claims.

What is claimed is:

1. A method of communicating a data signal on an electric power system, comprising:
   injecting the data signal on a medium voltage line of the electric power system;
   bypassing the data signal around a distribution transformer from the medium voltage line onto a low voltage line and transmitting the data signal to a customer premise; and
   modifying the transmission characteristics of the electric power system to reduce the data signal transmitted to the distribution transformer.

2. The method of claim 1, wherein modifying comprises increasing an impedance imposed by the electrical component on the data signal.

3. The method of claim 2, further comprising increasing inductive properties of the electrical component.

4. The method of claim 3, wherein the inductive properties are increased by an inductor.

5. The method of claim 3, further comprising adding one or more ferrite cores to the electric power system.

6. The method of claim 5, further comprising locating the ferrite cores around a connection point on the electrical component.

7. The method of claim 6, wherein the connection is on a primary side of a transformer.

8. The method of claim 6, wherein the connection point is on a secondary side of a transformer.

9. The method of claim 5, further comprising locating the ferrite cores around at least one conductor attached to the electrical component.

10. The method of claim 1, further comprising increasing an impedance from the electrical component to a point at which the data signal is provided to the network.

11. The method of claim 1, further comprising reducing electromagnetic noise created by the electrical component.

12. The method of claim 1, wherein the characteristics of the electrical power system are modified without substantially reducing the voltage signal.

13. The method of claim 12, wherein the voltage signal has a frequency substantially in the range of 0 to 100 Hertz.

14. The method of claim 1, wherein the data signal has a higher frequency than a voltage signal.

15. The method of claim 1, wherein the data signal has a frequency substantially in the range of 1 to 100 Mega Hertz.

16. A system for communicating a data signal on an electrical power system, comprising:
   a medium voltage power line;
   a low voltage power line;
   a distribution transformer connected to the medium voltage power line and the low voltage power line;
   a data source in communication with the medium voltage power line, wherein the data source communicates a data signal to the electric power system;
   a power line bridge that communicates the data signal from the medium voltage power line to the low voltage power line; and
   a blocking device in communication with the low voltage power line, wherein the blocking device prevents a portion of the data signal from being transmitted to the transformer.

17. The system of claim 16, further comprising a data termination device for communicating with the data signal, wherein the blocking device substantially permits the data signal to be communicated with the data termination device.

18. The system of claim 17, wherein the data termination device transmits and receives the data signal.

19. The system of claim 16, wherein the data termination device is a computing device located in a customer premise.

20. The system of claim 16, wherein the data termination device includes at least one of the following: a facsimile machine, a telephone, a television, appliance, and a computer.

21. The system of claim 16, wherein the data source transmits and receives the data signal.

22. The system of claim 16, wherein the blocking device transmits and receives the data signal.

23. The system of claim 16, further comprising a data network in communication with the data source.

24. The system of claim 23, wherein the data network is the Internet.

25. The system of claim 16, wherein the data source includes at least one of the following: a power line bridge, a router, a medium voltage coupler, and a computing device.

26. The system of claim 16, wherein at least one data communication line carries the data signal data between the data source and the blocking device.

27. The system of claim 16, wherein at least one service line carries the data signal and the voltage signal between the customer premise and the transformer.

28. The system of claim 16, wherein the blocking device is an inductor.

29. The system of claim 16, wherein the blocking device increases the impedance presented to the data signal without substantially influencing the voltage signal.

30. The device of claim 29, wherein the blocking device is an inductive element.

31. The device of claim 29, wherein the blocking device creates an impedance for the data signal.

32. The system of claim 29, wherein the blocking device is connected to an attachment lug on the distribution transformer.

33. The system of claim 32, wherein the attachment lug is connected to a primary winding on the distribution transformer.

34. The system of claim 32, wherein the attachment lug is connected to a secondary winding on the distribution transformer.

35. The system of claim 29, wherein the blocking device is located within the distribution transformer.

* * * * *

UNITED STATES PATENT AND TRADEMARK OFFICE
CERTIFICATE OF CORRECTION

| | |
|---|---|
| PATENT NO. | : 7,053,756 B2 |
| APPLICATION NO. | : 10/036914 |
| DATED | : May 30, 2006 |
| INVENTOR(S) | : Mollenkopf et al. |

It is certified that error appears in the above-identified patent and that said Letters Patent is hereby corrected as shown below:

On Title page Item 56 page 2, in field (56), under "U.S. Patent Documents", in column 1, line 18, delete "Gajjer" and insert - - Gajjar - -, therefor.

On Title page page 2 Item 56 (56), under "U.S. Patent Documents", in column 2, line 33, delete "4,749,992 A 6/1996 Fitzmeyer et al. 340/870.02".

On page 3, on Title Page Item 56 "U.S. Patent Documents", in column 2, line 1, delete "6,496,104 B1" and insert - - 6,496,104 B2 - -, therefor.

On page 3, on Title Page Item 56, under "U.S. Patent Documents", in column 2, line 27, delete "Weisman et al." and insert - -Wiesman et al. - -, therefor.

Title page page 3 Item 56, under "U.S. Patent Documents", in column 2, line 27, delete "340/870.02" and insert - - 340/310.01 - -, therefor.

Title page Item 56 Page 4, under "Other Publications", in column 2, line 18, after "htm" insert - - , - -.

Title Page Item 56 Page 5 (56), under "Other Publications", in column 1, line 17, delete "pp" and insert - - pp. - -, therefor.

Title Page Page 5 Item 56 (56), under "Other Publications", in column 1, line 29, delete "pp" and insert - - pp. - -, therefor.

Title Page Page 5 Item 56 (56), under "Other Publications" in column 1, line 54, after "Ontario" insert - - , - -.

Title Page Page 5 Item 56 (56), under "Other Publications", in column 1, line 55, delete "pp" and insert - - pp. - -, therefor.

Title Page  Page 5 Item 56 (56), under "Other Publications", in column 2, line 20, delete "pp" and insert - - pp. - -, therefor.

Title Page
On page 5, in field (56), under "Other Publications", in column 2, line 23, delete "pp" and insert - - pp. - -, therefor.
Title Page
On page 5, in field (56), under "Other Publications", in column 2, line 25, delete "Communications" and insert - - Communication - -, therefor.

UNITED STATES PATENT AND TRADEMARK OFFICE
CERTIFICATE OF CORRECTION

PATENT NO. : 7,053,756 B2
APPLICATION NO. : 10/036914
DATED : May 30, 2006
INVENTOR(S) : Mollenkopf et al.

It is certified that error appears in the above-identified patent and that said Letters Patent is hereby corrected as shown below:

Title Page
On page 5, in field (56), under "Other Publications", in column 2, line 49, delete "on ," and insert - - at - -, therefor.
Title Page
On page 6, in field (56), under "Other Publications", in column 2, line 17, delete "Joins" and insert - - joins - -, therefor.
Title Page
On page 6, in field (56), under "Other Publications", in column 2, line 27, delete "Spain." and insert - - Spain, - -, therefor.
Title Page
On page 6, in field (56), under "Other Publications", in column 2, line 27, after "2004]" insert - - , - -.

On Sheet 1 of 5, in FIG. 1, line 2 (Reference Numeral - 102), delete "Tranmission" and insert - - Transmission - -, therefor.

On Sheet 1 of 5, in FIG. 1, line 2 (Reference Numeral - 103), delete "Tranmission" and insert - - Transmission - -, therefor.

On Sheet 2 of 5, in Figure 2B, delete "(Zt)" and insert - - $(Z_t)$ - -, therefor.

On sheet 2 of 5, in Figured 2B, delete "(Zl)" and insert - - $(Z_l)$ - -, therefor.

In column 4, line 49, delete "premise," and insert - - premise 106, - -, therefor.

In column 4, line 50, delete "data." and insert - - data signal. - -, therefor.

In column 4, line 52, delete "impendance" and insert - - impedance - -, therefor.

In column 4, line 61, delete "tupically" and insert - - typically - -, therefor.

In column 4, line 66, delete "appriciated" and insert - - appreciated - -, therefor.

In column 5, line 2, before ". As part" delete "105".

In column 5, lines 10-11, delete "impendance" and insert - - impedance - -, therefor.

In column 5, line 11, delete "frequincies," and insert - - frequencies, - -, therefor.

In column 8, line 16, delete "compoents" and insert - - components - -, therefor.

UNITED STATES PATENT AND TRADEMARK OFFICE
CERTIFICATE OF CORRECTION

PATENT NO. : 7,053,756 B2
APPLICATION NO. : 10/036914
DATED : May 30, 2006
INVENTOR(S) : Mollenkopf et al.

It is certified that error appears in the above-identified patent and that said Letters Patent is hereby corrected as shown below:

In column 9, line 56, in Claim 7, after "connection" insert - - point - -.

In column 10, line 2, in Claim 12, delete "electrical" and insert - - electric - -, therefor.

In column 10, line 3, in Claim 12, delete "the" and insert - - a - -, therefor.

In column 10, line 11, in Claim 16, delete "electrical" and insert - - electric - -, therefor.

Signed and Sealed this

Twelfth Day of September, 2006

JON W. DUDAS
*Director of the United States Patent and Trademark Office*